United States Patent
Lecoeuche

(10) Patent No.: US 7,602,499 B2
(45) Date of Patent: Oct. 13, 2009

(54) MEASURING POLARIZATION MODE DISPERSION

(75) Inventor: Vincent Lecoeuche, Saint-Etienne (FR)

(73) Assignee: Acterna LLC, Germantown, MD (US)

( * ) Notice: Subject to any disclaimer, the term of this patent is extended or adjusted under 35 U.S.C. 154(b) by 444 days.

(21) Appl. No.: 11/695,687

(22) Filed: Apr. 3, 2007

(65) Prior Publication Data

US 2008/0068607 A1 Mar. 20, 2008

(30) Foreign Application Priority Data

Sep. 16, 2006 (EP) .................................. 06254826

(51) Int. Cl.
*G01B 9/02* (2006.01)
*G01B 21/00* (2006.01)
(52) U.S. Cl. ...................................... 356/491; 356/73.1
(58) Field of Classification Search ................ 356/73.1, 356/477, 491; 250/227.19, 227.27
See application file for complete search history.

(56) References Cited

U.S. PATENT DOCUMENTS

| | | | | |
|---|---|---|---|---|
| 4,198,123 A * | 4/1980 | Kremen | ....................... | 359/496 |
| 5,654,793 A | 8/1997 | Barlow et al. | | |
| 6,380,533 B1 | 4/2002 | Jopson et al. | ................ | 250/225 |
| 6,498,869 B1 | 12/2002 | Yao | .............................. | 385/11 |
| 6,519,027 B1 | 2/2003 | Gordon et al. | ............. | 356/73.1 |
| 6,947,129 B1 | 9/2005 | Lu et al. | ..................... | 356/73.1 |
| 7,212,281 B2 * | 5/2007 | Tanigawa et al. | ........... | 356/73.1 |
| 7,227,645 B2 * | 6/2007 | Cyr | ............................. | 356/491 |
| 7,426,021 B2 * | 9/2008 | Cyr | ............................. | 356/73.1 |

FOREIGN PATENT DOCUMENTS

| | | |
|---|---|---|
| WO | WO02/077680 | 10/2002 |
| WO | WO/2004/025242 | 3/2004 |

OTHER PUBLICATIONS

Gisin at al, "How accurately can one measure a statistical quantity like polarization-mode disperson", IEEE Photonics Technology Ltrs 8, No. 12, p. 1671 (1996).
Oberson at al, "Interferometric PMD Measurements with Femtosecond sensitivity", J. Lightwave Techno. 15, No. 10, 1997.

* cited by examiner

*Primary Examiner*—Michael A Lyons
(74) *Attorney, Agent, or Firm*—Matthew A. Pequignot; Pequignot + Myers LLC

(57) ABSTRACT

A device for measuring polarization mode dispersion (PMD) in a device under test (DUT) includes a polarized light source for launching a test beam through the DUT, and a PMD analyzer, which uses one of a plurality of known techniques, e.g. fixed analyzer-Fourier transform (FA-FT) or interferometric, to calculate the PMD from the DUT. A passive depolarizer, made up of a plurality of birefringent elements is disposed between the light source and the PMD analyzer to generate a plurality of carrier frequencies that correspond to the delays imposed by the birefringent elements. The PMD content of the DUT is present around each of the carriers, and the plurality of PMD measurements can be averaged to obtain a more accurate and repeatable measure of the PMD.

12 Claims, 4 Drawing Sheets

MEASURING POLARIZATION MODE DISPERSION

CROSS-REFERENCE TO RELATED APPLICATIONS

The present invention claims priority from European Patent Application No. 06254826.8 filed Sep. 16, 2006, which is incorporated herein by reference.

TECHNICAL FIELD

The present invention relates to a device for measuring polarization mode dispersion (PMD), and in particular to a device for measuring PMD including a depolarizer with a plurality of birefringent elements.

BACKGROUND OF THE INVENTION

Polarization mode dispersion (PMD) is a distortion mechanism, like chromatic dispersion, that causes optical devices, such as single-mode fibers, optical switches and optical isolators, to distort transmitted light signals, which can result in random signal fading, increased composite second order distortion, and increased error rates. The relative severity of PMD, which is a function of the wavelength of the transmitted light, has increased as techniques for dealing with chromatic dispersion have improved, transmission distances have increased, and bit rates have increased.

PMD is due to differential group delay (DGD) caused by geometrical irregularities and other sources of birefringence in the transmission path of the optical device. For example, a single-mode fiber (SMF) is ideally a homogeneous medium supporting only one mode. In practice, it supports two propagation modes with orthogonal polarizations. When a lightwave source transmits a pulse into a SMF fiber, the pulse energy is resolved onto the principal states of polarization (PSP) of the fiber. The two groups of pulse energy propagate at different velocities and arrive at different times causing pulse broadening and signal distortion. When the core of the fiber that bounds the light is asymmetrical, the light traveling along one polarization axis moves slower than the light polarized along the other axis, which can result in the pulse spreading, thereby overlapping with other pulses, or changing shape, thereby making it undetectable at the receiver.

Determining the PMD of installed optical fibers is useful for determining the capacity of the fibers for transmitting new telecommunication services, and for the design and control of PMD compensators.

The PMD of a fiber is commonly characterized by two specific orthogonal states of polarization called the principal states of polarization (PSPs) and the differential group delay (DGD) therebetween. The DGD can be described at an optical wavelength $\lambda$ by the 3-component Stokes vector, $[\Omega(\lambda)]=\Delta\tau q$, where q is a unit Stokes vector pointing in the direction of the faster PSP, and the magnitude $\Delta\tau$ is the DGD. Typical DGD values encountered in transmission systems range between a few tens of fs and 100 ps.

Known methods for determining PMD vectors include the Jones Matrix Eigenanalysis (JME) technique and the Muller Matrix Method (MMM). Each of these techniques uses a tunable, continuous-wave laser and a polarimeter to measure the output polarization states for two (or three) different input polarization launches at two optical frequencies. The PMD vector is then calculated for the midpoint frequency. In addition to determining the output PMD vector, the Muller Matrix Method determines the rotation matrix of the fiber at each frequency and thus the input PMD vector can be calculated. Shortcomings of these techniques are that they are somewhat difficult to implement, particularly in a feedback system, because they require frequency differentiation of measured data at plural optical frequencies.

The disclosed invention relates to the measurement of polarization mode dispersion with a Fixed Analyzer-Fourier Transform (FA-FT) method or an interferometric (INTFER) method, which are well known in the prior art. Typically, for the INTFER method, a broadband light source is sent through a DUT and then into an interferometer. As the moveable arm of the interferometer is reciprocated, interference fringes are observed at a detector only if the time-delay difference between the two arms matches a delay generated in the DUT to within the coherence time of the light source. For a non-mode-coupled device, a delay histogram with a central peak and two side lobes is formed by plotting the envelope of interference fringes as the moveable arm of the interferometer is scanned. The central peak is the autocorrelation of the source, which provides no information relating to the PMD; however, the distance from either side lobe to the central peak is a measure of the average DGD over the spectrum of the light source. Alternatively, the separation between the two side lobes is equal to twice the average DGD over the spectrum of the light source.

The INTFER method can also be used to measure the DGD in mode-coupled devices; however, if there are N mode coupling sites, there will be $2^{N+2}-1$ peaks in the resulting delay histogram. The separation of adjacent peaks can easily be less that the coherence time of the light source, and so the peaks are not necessarily distinguishable; accordingly, the resulting delay histogram envelope comes from the coherent addition of the various delays. The RMS DGD value can be obtained from the second moment of the "Gaussian-shaped" delay histogram. Unfortunately, there are non-ideal features of the delay histogram that make it deviate from a true Gaussian shape, e.g. the autocorrelation peak and the noise floor. Attempts have been made to correct for these features during the mathematical calculation, but so far none have been completely successful.

The FA approach, a.k.a. the wavelength scanning approach, indirectly measures the mean DGD by detecting light transmitted through a polarizer/DUT/polarizer set-up as a function of wavelength. The light source can either be a tunable laser, requiring a single detector, or a broadband source with an optical spectrum analyser. As the output polarization vector $s_{out}(\omega)$ moves around the Poincare sphere, the normalized intensity $I_N(\omega)$ transmitted through the output polarizer can be defined as:

$$I_N(\omega)=\tfrac{1}{2}(1+\sin\Phi\cos[\theta(\omega)]\sin\phi+\cos\Phi\cos\phi)$$

In which the angles are in Poincare sphere coordinates, $\Phi$ is the angle between $\Omega$ and the Stokes vector describing the transmission axis of the output polarizer, and $\phi$ is the angle between $s_{out}$ and $\Omega$. $\phi$ and $\Phi$ are independent of $\omega$ for non-mode-coupled devices. $\theta(\omega)$ is the azimuthal angle of the precession of $s_{out}(\omega)$ about $\Omega$. For non-mode-coupled devices, $\theta(\omega)$ depends approximately linearly on c and contains all of the optical frequency dependence of $I_N(\omega)$. Accordingly, $d\theta/d\omega$ and thereby the average DGD ($\Delta\tau$) can be determined by counting the number of extremer, i.e. peaks and valleys, in the sinusoidal $I_N(\omega)$ curve over a given optical frequency range. Alternatively, the $I_N(\omega)$ spectrum can be Fourier transformed (FA-FT) into the time domain, resulting in a delay histogram very similar to one, which would be produced from an interferometric measurement utilizing the same optical light source spectrum.

However, the DUT always exhibits eigenstates of polarisation with a slow and fast axis, which is true even for the most common case of strong coupling fibres, although in that case the eigenaxes rotate with the wavelength. Considering that the light is launched without any control on the orientation of its polarization state with respect to the fibre eigenaxis at the input, nor on the orientation of the output polarizer with respect to the fibre eigenaxis at the output, it can easily be understood that the measurement suffers from poor repeatability. The repeatability is directly related to the number of rotations of the eigenaxis over the wavelength span of the analysis. More precisely, the standard deviation of the measurements is inversely proportional to the square root of the product of the wavelength span and the PMD value of the DUT, which was demonstrated by Gisin et al in "*How accurately can one measure a statistical quantity like polarization-mode dispersion?*", IEEE Photonics Technology Letters 8, no. 12, p. 1671 (1996) and applied to a set of different wavelength spans for a given DUT. Unfortunately, Gisin et al did not consider different launch conditions; however, experiments by the inventors of the present invention showed that their formula fit a set of different launch polarisation states for a given DUT and wavelength span. With commonly available sources that can cover a spectral range of about 100 nm to 150 nm and a DUT with a rather large mean PMD, e.g. 10 ps, the standard deviation of the measurement is about 3% of the value measured. Given the inherent variations of the PMD value with temperature and strain, 3% is considered by most as a good enough accuracy for determining whether or not a fibre may carry 10 Gbit traffic. When considering a 2.5 ps mean delay, which is the limitation for 40 GBit traffic, the standard deviation rises by a factor 2. The purpose of the present invention is to recover this accuracy degradation and offer a measurement at 2.5 ps that is as accurate as the current devices are at 10 ps. Note: in presence of attenuation or in the case of amplified links, the available spectral range is lowered (down to about 35 nm for a C-Band amplified link) with a consequent diminution of the accuracy.

In the past, one possible solution described in literature and standards is to repeat and average successive measurements with different input/output. However, polarization controller/scramblers are quite costly devices, and the repetitive process increases the duration of the measurement. Accordingly, a passive device to do the scrambling in another manner and yield a proper repeatability in a single measurement is more desirable.

The use of a birefringent or wavelength specific "artefact" was proposed in U.S. Pat. No. 5,654,793 issued Aug. 5, 1997 to Barlow et al, in order to bias the PMD away from the "spurious (near zero) PMD response", and enable measurements below 0.1 ps. Unfortunately, the Barlow et al method does not improve the repeatability of the measurement because for such small DGD the spread depends strongly on the polarization mode coupling between the fibre under test (FUT) and the highly birefringent (HiBi) fibre. With a single birefringent element inserted in the optical path, two eigenaxis are privileged, and the measurement remains strongly polarization sensitive, in particular for PMD below 0.1 ps for which even a strong-coupled fibre exhibits weak coupling features, which was demonstrated by Oberson et al in "*Interferometric PMD measurements with femtosecond sensitivity*", J. Lightwave Techno. 15, No. 10, 1997, who proposed to monitor the bias frequency while actively controlling the polarisation launch conditions and successfully measured very low PMD values. Unfortunately, Oberson et al method required active control over the launch conditions, while, as already mentioned above, a method that uses a passive device is more desirable.

An object of the present invention is to improve the accuracy and repeatability of the measurement over the whole measurement range. Moreover, working with fast "ac" signals will help to isolate the signal of interest out of the amplifier's ASE and slow variations.

SUMMARY OF THE INVENTION

Accordingly, the present invention relates to a device for measuring polarization mode dispersion (PMD) of an optical device under test (DUT) comprising:

a polarized light source for launching an optical test signal, having a polarization state, through the DUT;

light depolarizing means between the polarized light source and the optical device, comprising: a first birefringent element having an eigenaxis oriented at an acute angle to the polarization state of the optical test signal; and a second birefringent element having an eigenaxis oriented at an acute angle to the eigenaxis of the first birefringent element and the polarization state of the optical test signal; whereby the optical test signal includes a plurality of carrier components associated with time delays from the first and second birefringent elements; and analyzing means for calculating the average PMD of the DUT by taking an average of the PMD from the plurality of carrier components. dr

BRIEF DESCRIPTION OF THE DRAWINGS

The invention will be described in greater detail with reference to the accompanying drawings which represent preferred embodiments thereof, wherein.

DETAILED DESCRIPTION

Figure 1:
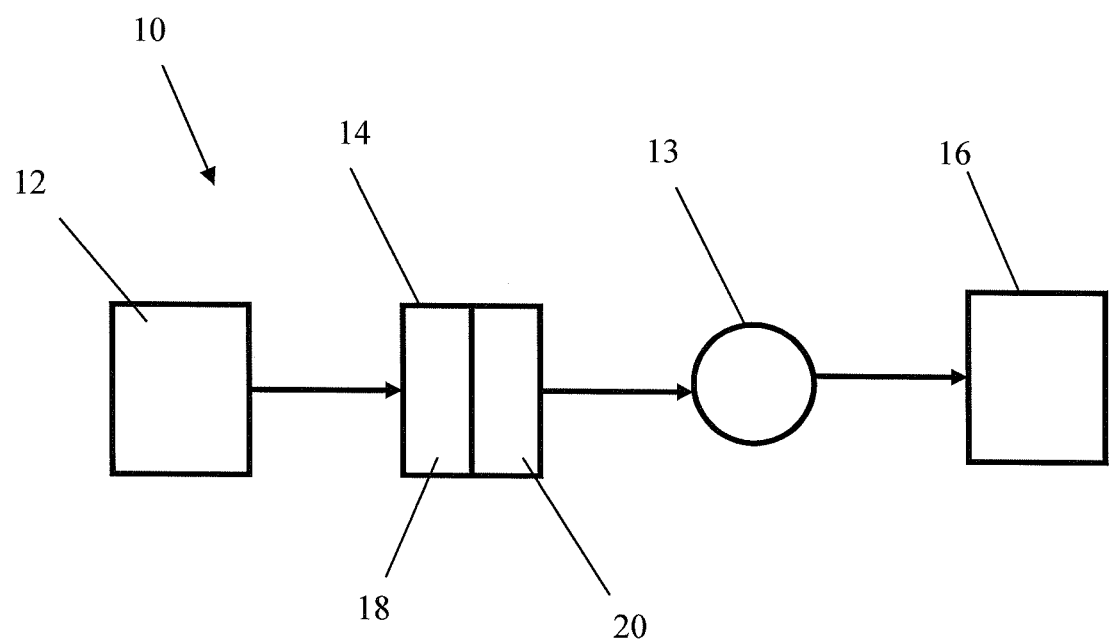
FIG. 1 is a schematic illustration of a device for measuring polarization mode dispersion according to the present invention.

With reference to FIG. 1, the polarization mode dispersion (PMD) measuring device 10, according to the present invention, includes a broadband polarized light source 12 for launching a polarized test beam through a device under test (DUT) 13, a light depolarizer 14, and PMD analyzing equipment 16. The light source 12 may comprise an independent polarized light source or a light emitting device with a light polarizer, which polarizes the output of the light emitting device. Typically, the light source launches an optical test signal with a desired polarization state with a spectral range greater than 100 nm, e.g. approximately 100 nm to 150 nm.

The depolarizer 14 includes first and second birefringent elements 18 and 20. The first birefringent element 18 has an eigenaxis oriented at an acute angle (between $-\pi/2$ and $\pi/2$) to the polarization state of the optical test signal. The second birefringent element 20 having an eigenaxis oriented at an acute angle (between $-\pi/2$ and $\pi/2$) to the eigenaxis of the first birefringent element 18 and the polarization state of the optical test signal.

The basic function of the depolarizer 14 is to convert the light from the polarized light source 12 into a randomly polarized output. Actually the light is depolarized, on average over wavelength, since there is no such thing as depolarized light, i.e. at any given wavelength, light always has a state of polarization. The function of the depolarizer 14 is to scramble the polarization so that on average over wavelength, there appears to be no specific polarization state. The light must have a range of wavelengths, each interacting differently with the birefringent elements 18 and 20, resulting in an averaging effect. The depolarization is created by the superposition of the circularly, elliptically and linearly polarized light in different wavelengths.

The present invention is particularly suited for use with PMD analyzing equipment 16 selected from either the Fixed Analyzer-Fourier Transform (FA-FT) arrangement or the interferometric arrangement as are described in the IEC standards 61280 and 61282, which are incorporated herein by reference. For both measurement methods the carrier delays are directly dependent on the delay the light experiences in propagating through the depolarizer 14. In the case of the interferometric technique, the carriers are monitored by the detector when the path imbalance between the two arms matches the differential delays produced by the birefringent elements 18 and 20. In the case of the wavelength scanning technique the light intensity through the Lyot depolarizer and DUT (optical fiber) are measured as a function of wavelength and the Fourier transform of the spectrum taken. The carriers are the delays of the components generated in the taking of the Fourier transform.

The depolarizer 14 produces four known, stable carrier components, thereby ensuring that the PMD measurement will have four known interference peak levels at four different times, which correspond to the delay in each birefringent element 18 and 20 as well as the sum and difference of the delays thereof. The PMD content of the DUT 13 is present around each of the carriers and a mean value can be determined. For a depolarizer 14 comprising two birefringent elements 18 and 20, with lengths $L_1$ and $L_2$, there is light in different polarization states that can propagate through the elements along four different paths, i.e. as either an o-ray or e-ray in elements 18 or 20. Accordingly, there are four possible optical path length differences $(n_o-n_e)L_1$, $(n_o-n_e)L_2$, $(n_o-n_e)(L_1+L_2)$ and $(n_o-n_e)(L_1-L_2)$, which leads to four different carrier delays (if the lengths are properly chosen) which gives four measurements for the PDM that can be averaged.

The depolarizer 14 can be a pair of birefringent waveplates, a pair of birefringent fibers or a pair of other birefringent devices. The four different times are the time differences between the fast and slow polarization modes, or simply the PMD of the device. Ideally, the depolarizer is a Lyot type depolarizer, in which the first birefringent element 18 has an eigenaxis oriented at $+/-\pi/6$ with respect to the linear polarization state of the optical test signal, and the second birefringent element 20, is orientated with a $+/-\pi/4$ angle with respect to the eigenaxis of the first element 18, thereby ensuring that all four carrier components are always visible in the spectrum. With a Lyot type depolarizer made of at least two birefringent sections, the Poincare sphere is rapidly covered across the wavelength span. However, other forms of depolarisers are within the scope of the invention, including depolarisers with more than two birefringent elements. The depolarizer 14 may contain additional birefringent elements, having an eigenaxis oriented at an acute angle (between $-\pi/2$ and $\pi/2$) to the eigenaxis of the other birefringent elements 18 and 20 and the polarization state of the optical test signal, to provide additional carrier components, if required.

The range of delay measurements is directly limited to half of the time difference between two carriers, above which information overlap will occur. Up to a certain point software can be adapted to neglect this overlap area or eventually compensate the result. Choice of the carrier delays also can be adjusted to provide a higher measurement range on one to three of the carriers, while using only the other carriers for low PMD value measurements. Ideally, for low PMD value measurements two or more of the carriers are within 5 ps to 30 ps of each other; however, to provide a higher measurement range two or more of the carriers are within 30 ps to 100 ps of each other. Typically, if a carrier is at 60 ps from the first adjacent one, it can be used to measure delays up to 30 ps and therefore mean delays up to 10 ps in strong coupling mode. Therefore, it is preferable to have at least one component carrier 50 ps or more, most preferable 60 ps or more, from any adjacent component carriers, while having at least one component carrier within 40 ps, most preferable within 30 ps, of each other As an example, if the first and second birefringent elements were provided with delays of 30 ps and 120 ps, respectively, the four component carrier delays would be 30 ps, 90 ps (120-30), 120 ps and 150 ps (120+30). Accordingly, the device would to be able to measure up to 10 ps with the first carrier and up to 5 ps with the three others.

In practice the use of polarization maintaining fibre is preferable to bulk optics for the first and second birefringent elements 18 and 20, as they introduce differential delays of more than 1 ps per meter of fibre with very low loss. Other means of producing the delays could be used instead of birefringent elements that would allow the use of bulk optics, e.g. a polarization beam splitter, two different path lengths and a polarization combiner.

Figure 2:
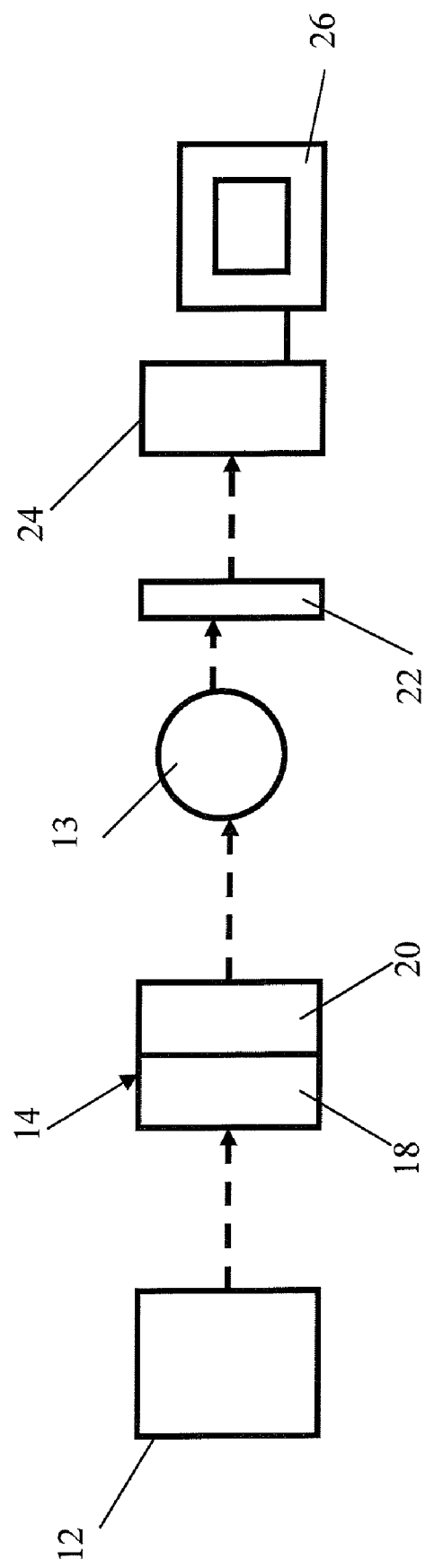
FIG. 2 is a schematic illustration of an embodiment of the device of FIG. 1.
Figure 3:
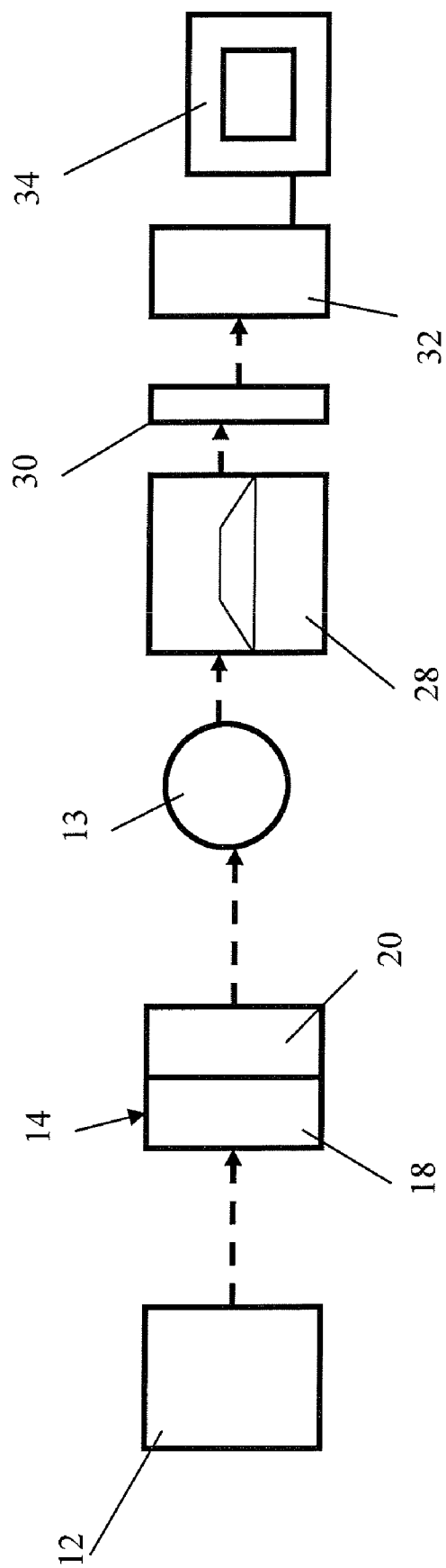
FIG. 3 is a schematic illustration of another embodiment of the device of FIG. 1.

For the FA-FT arrangement, illustrated in FIG. 2, the broadband light source 12 launches a polarized optical test signal through the depolarizer 14 to the DUT 13. A polarizer 22 analyzes the light polarization state, and an optical spectrum analyzer (OSA) or monochromatic 24 enables the polarization transmission versus optical wavelength to be measured. A computer 26 performs Fourier analysis on the results from the OSA 24, controls the functions of the light source 12 and the OSA 24, and calculates the PMD based on the average of the two, three or four of the measurements provided.

For the INTFER set-up, the broadband light source 12 launches a polarized optical test signal through the depolarizer 14 to the DUT 13, and the output of the DUT 13 is delivered to an interferometer 28. The interferometer 28, e.g. Mach Zehnder or Michelson, splits the test signal into two sub-beams, which travel along separate paths, one of which has an adjustable delay line, and then recombines the two sub-beams generating an interference pattern. The output of the interferometer 28 passes through an analyser 30 and the intensity of transmitted signal is measured with a detector 32, while scanning the path difference between the two arms of the interferometer 28. This interferogram is similar to the one obtained with FA-FT set-up described above. The interference signature versus the setting of the delay line is acquired and stored using a computer 34, which then calculates the PMD based on the average of two, three or four of the measurements provided.

Figure 4:
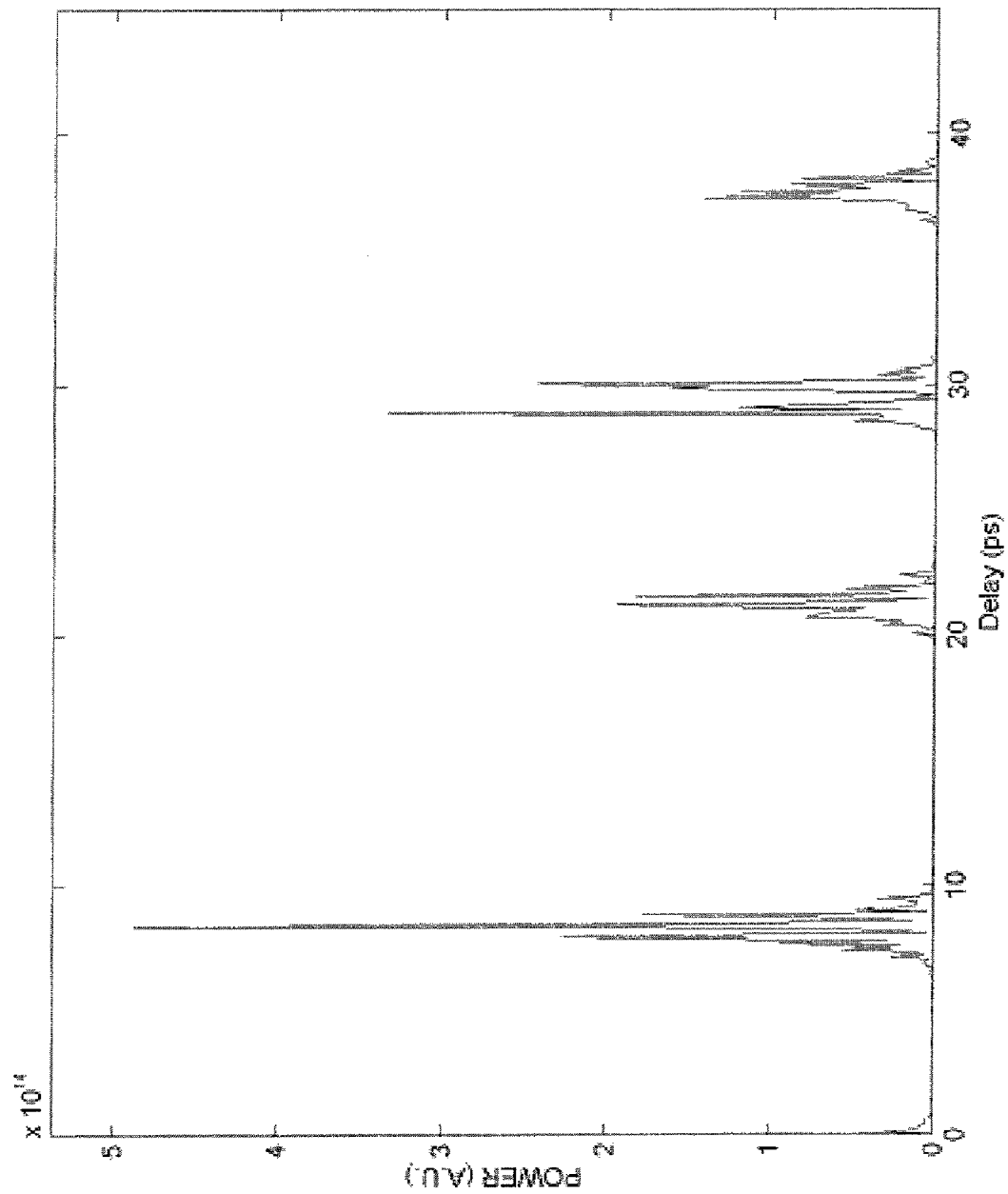
FIG. 4 is graphical illustration of four carrier components generated by the device of FIG. 1.

The first step of the numerical analysis of the signal is to identify the four carriers that correspond to the delay of the two birefringent sections 18 and 20 as well as the sum and difference of those two delays. In the example illustrated in FIG. 4, the first element 18 is a highly birefringent (HiBi) fiber with a 8 ps delay with $\pi/6$ angle to the polarization state of the optical test signal, and the second element 20 is a HiBi fiber with a 29 ps delay with a $\pi/4$ angle to the eigenaxis of the first element 18, providing a sum delay of 37 ps and a difference delay of 21 ps. The width of each carrier are then analysed, and the four results averaged to yield the PMD value of the DUT 13, which in the illstrated example is a single mode fiber of 100 kms in length transmitting an optical test signal from a 1550 nm SLED. A simple averaging provides a good improvement of the repeatability for PMD values above 0.1 ps. For values under 0.1 ps, the DUT (or FUT) 13, even though it can still be considered as a strongly-coupled device, exhibits weak coupling features over a sufficiently small wavelength span. The eigenaxes of the FUT 13 are nearly constant, and the polarization coupling conditions from the depolarizer 14 to the FUT 13, and from the FUT 13 to the analyser may create abnormally high or low values of PMD on some of the carriers. It was found that those accidents were also accompanied by a very weak power of the carrier, whereas other carriers would provide the expected value and have a much higher power. As a consequence, those accidents can be smoothed out by attributing a weight proportional to the power of each carrier, when averaging the four carrier's widths. Alternatively, the four carriers signals can be merged into one, and the RMS width of the resulting peak be calculated, this simple averaging of the four peaks would automatically weight the contribution of each carrier performing a weighted averaging of the four carrier's width considerably reduces the dispersion of the measurements for PMD values below 0.1 ps.

I claim:

1. A device for measuring polarization mode dispersion (PMD) of an optical device under test (DUT) comprising:
    a polarized light source for launching an optical test signal, having a polarization state, through the DUT;
    light depolarizing means between the polarized light source and the optical device, comprising:
        a first birefringent element having an eigenaxis oriented at an acute angle to the polarization state of the optical test signal; and
        a second birefringent element having an eigenaxis oriented at an acute angle to the eigenaxis of the first birefringent element and the polarization state of the optical test signal;
        whereby the optical test signal includes a plurality of carrier components associated with time delays from the first and second birefringent elements; and
    analyzing means for calculating the average PMD of the DUT by taking an average of the PMD from the plurality of carrier components.

2. The device according to claim 1, wherein the average is a weighted average based on the power of each carrier.

3. The device according to claim 1, wherein the average is obtained by merging the plurality of carriers into a resultant peak, and calculating the RMS width of the resultant peak.

4. The device according to claim 1, wherein the analyzing means comprises a fixed axis-Fourier transform set-up including:
    a polarizer for analyzing the optical test signal exiting the DUT;
    an optical spectrum analyzer for generating an optical spectrum of a polarization transmission versus optical wavelength from the optical test signal exiting the polarizer; and
    a computer for Fourier transforming the optical spectrum and calculating the average PMD from the plurality of carrier components.

5. The device according to claim 1, wherein the analyzing means comprises an interferometric set-up including:
    an interferometer for interfering portions of the optical test signal forming a transmitted signal;
    a detector for measuring intensity of the transmitted signal; and
    a computer for calculating the average PMD from the plurality of carrier components.

6. The device according to claim 1, wherein the plurality of carrier components comprise:
    a first carrier component based on a difference between ordinary and extraordinary optical path lengths through the first birefringent element;
    a second carrier component based on a difference between ordinary and extraordinary path lengths through the second birefringent element;
    a third carrier component based on a difference between ordinary and extraordinary optical path lengths through the combination of the first and second birefringent elements; and
    a fourth carrier component based on a difference between ordinary and extraordinary optical path lengths through a difference between the first and second birefringent elements.

7. The device according to claim 6, wherein the first, second, third and fourth carrier components are within 5 ps to 30 ps of adjacent carrier components.

8. The device according to claim 6, wherein at least one of carrier components is 50 ps or more from adjacent carrier components for measuring PMD up to 10 ps, and at least one of the carrier components is within 5 to 30 ps of each other for measuring PMD up to 5 ps.

9. The device according to claim 6, wherein the eigenaxis of the first birefringent element is oriented at $\pm\pi/6$ with respect to the polarization state of the optical test signal; and wherein the eigenaxis of the second birefringent element is oriented at $\pm\pi/4$ to the eigenaxis of the first birefringent element.

10. The device according to claim 6, further comprising a third birefringent element having an eigenaxis oriented at an acute angle to the eigenaxis of the first and second birefringent elements and the polarization state of the optical test signal providing additional carrier components; wherein a plurality of the carrier components are from 5 ps to 30 ps from each other for measuring low range measurements; and wherein a plurality of the carrier components are from 30 ps to 100 ps from each other for measuring higher range measurements.

11. The device according to claim 1, wherein the eigenaxis of the first birefringent element is oriented at $\pm\pi/6$ with respect to the polarization state of the optical test signal; and wherein the eigenaxis of the second birefringent element is oriented at $\pm\pi/4$ to the eigenaxis of the first birefringent element.

12. The device according to claim 1, further comprising a third birefringent element having an eigenaxis oriented at an acute angle to the eigenaxis of the first and second birefringent elements and the polarization state of the optical test signal providing additional carrier components; wherein a plurality of the carrier components are from 5 ps to 30 ps from each other for measuring low range measurements; and wherein a plurality of the carrier components are from 30 ps to 100 ps from each other for measuring higher range measurements.

* * * * *